UNITED STATES PATENT OFFICE.

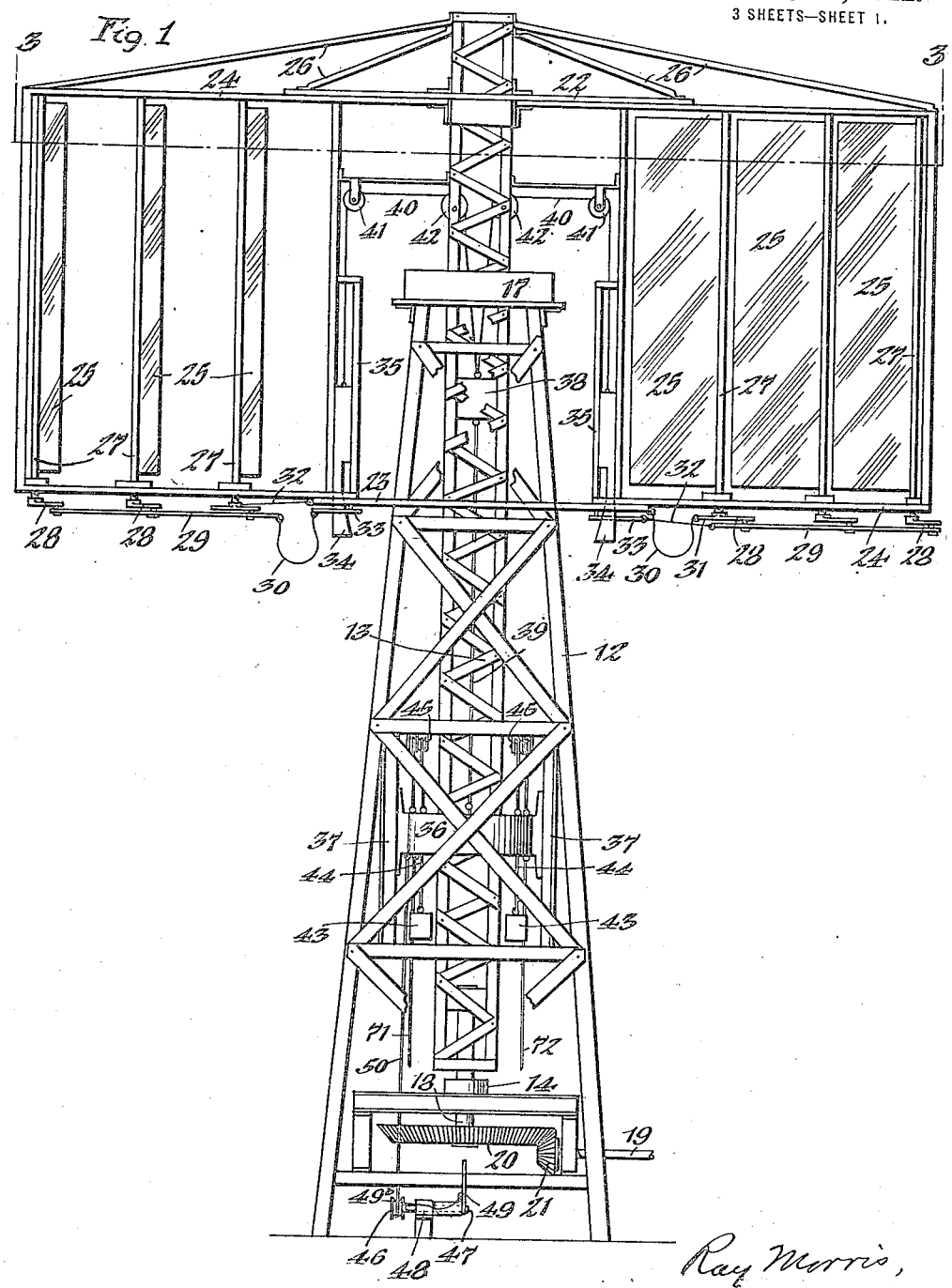

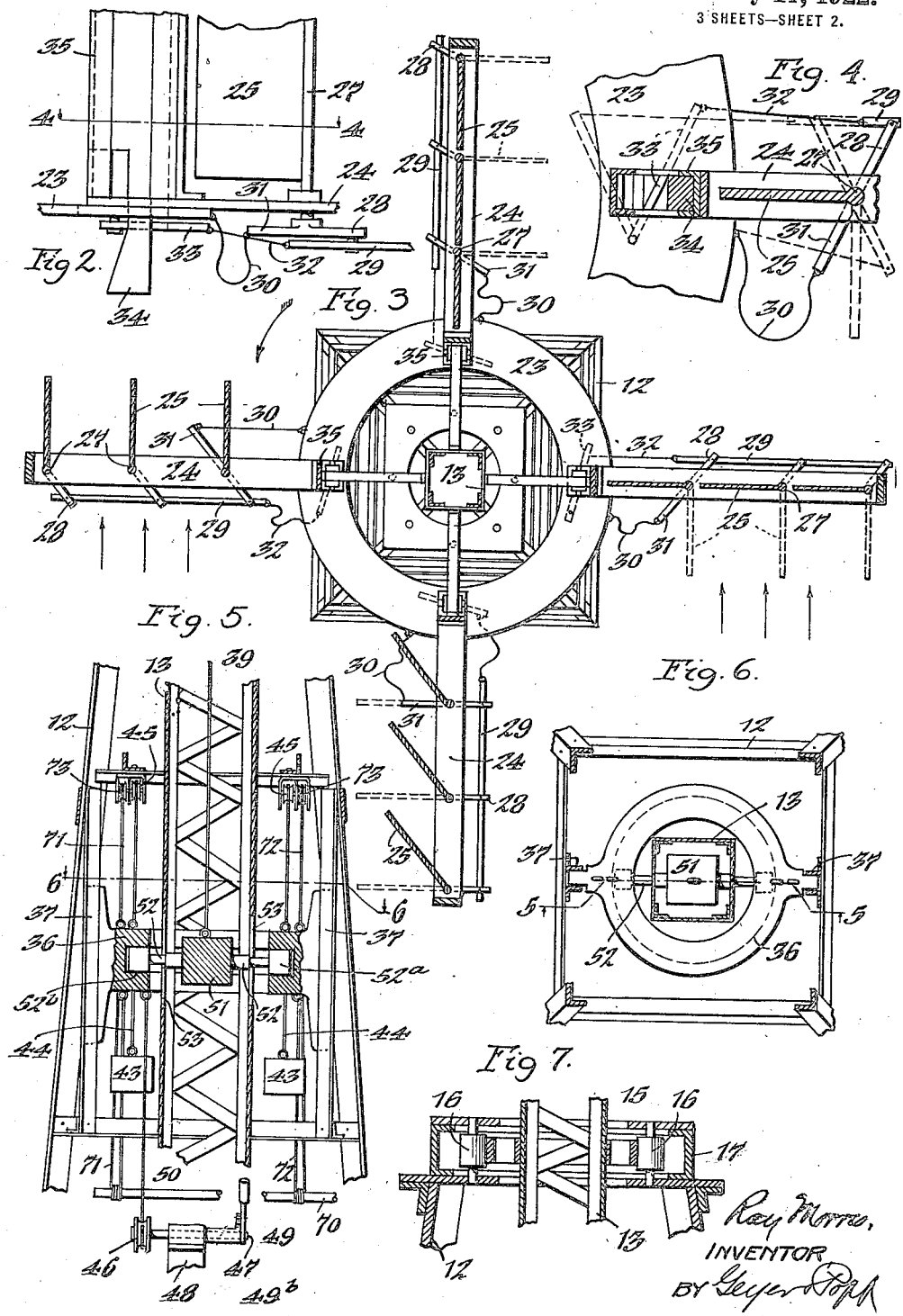

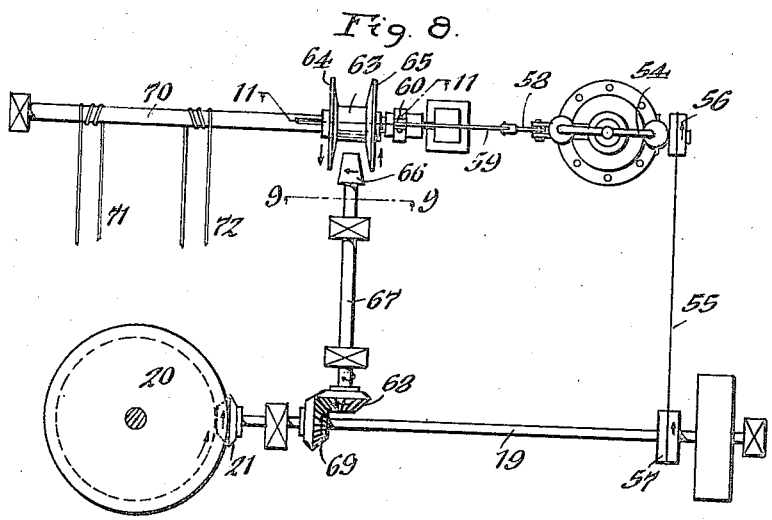
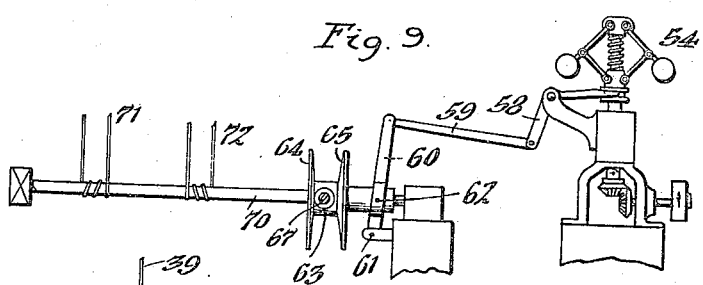
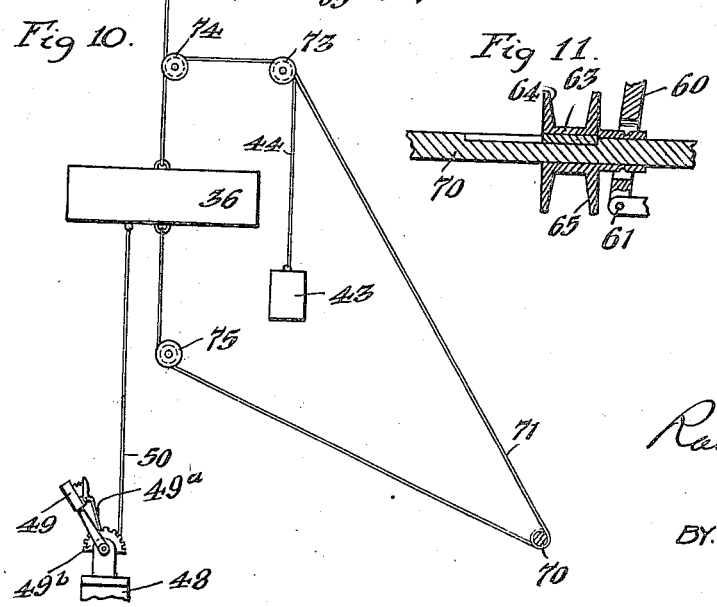

RAY MORRIS, OF NIAGARA FALLS, NEW YORK.

WINDMILL.

1,422,602.    Specification of Letters Patent.    Patented July 11, 1922.

Application filed April 15, 1920. Serial No. 374,027.

*To all whom it may concern:*

Be it known that I, RAY MORRIS, a citizen of the United States, residing at Niagara Falls, in the county of Niagara and State of New York, have invented new and useful Improvements in Windmills, of which the following is a specification.

This invention relates to the type of wind mills in which the wheel or rotary frame carrying the blades or vanes is arranged horizontally instead of vertically, so that the mill is always ready to run, regardless of the direction of the wind and without the use of a vane for turning it into the wind.

One of the objects of the invention is to improve the construction of this horizontal type of wind mills with a view to obtaining the maximum power in proportion to the vane-area exposed to the wind, and with the minimum resistance of the vanes on the return-side of the wheel.

A further object is the production of a mill of this type which can be easily started and stopped.

Another object is to provide the mill with an efficient governing mechanism for automatically turning the vanes relatively to the wheel as the latter revolves and presenting them at a greater or less angle to the wind, according to its varying force and velocity, thereby preventing the wheel from running at a destructive velocity and maintaining a practically constant speed of the mill which adapts it for driving machinery requiring a steady and uniform motion.

In the accompanying drawings: Figure 1 is a side elevation, partly broken away, of a wind mill embodying the invention, parts of the governing mechanism being omitted. Figure 2 is an enlarged side elevation of the lower portion of the wheel showing the means for automatically swinging the vanes on their pivots. Figure 3 is a horizontal section on line 3—3, Fig. 1. Figure 4 is a similar section on line 4—4, Fig. 2. Figure 5 is a fragmentary vertical section on line 5—5, of Fig. 6. Figure 6 is a horizontal section on line 6—6, Fig. 5. Figure 7 is a fragmentary vertical section of the shaft-bearing at the top of the tower. Figure 8 is a diagrammatic top plan view of parts of the wind mill and its governing devices. Figure 9 is a vertical section on line 9—9, Fig. 8. Figure 10 is a sectional diagrammatic side view of the elevator or main weight which actuates the wedges of the vane-turning devices, and the connections between said weight and its counterweights. Figure 11 is an enlarged longitudinal section of the friction drum on line 11—11, Fig. 8.

Similar characters of reference indicate corresponding parts throughout the several views.

12 indicates the stationary tower or supporting structure of the wind mill which may be of structural steel, or other suitable material, and 13 indicates an upright shaft or column carrying the wheel of the mill and journaled centrally in the tower 12, the lower end of the shaft being preferably supported in a ball or other anti-friction step-bearing 14 carried by the base portion of the tower. In its preferred form, as shown, the shaft 13 is square and made of structural steel in skeleton form, to give it great strength combined with lightness. Its upper portion turns in an anti-friction bearing which steadies it and which, in the construction shown, comprises a horizontal bearing-ring 15 secured to the shaft and bearing against a surrounding row of upright rollers 16 journaled in an annular cap or frame 17 secured to the top of the tower, as best shown in Fig. 7. Below its step-bearing, the skeleton shaft 13 is provided with a cylindrical extension 18 from which motion is transmitted to the horizontal driven shaft 19 by bevel gears 20, 21, or any other suitable mechanism.

The wheel or rotary frame of the wind mill is secured to the upper portion of the upright shaft 13 and preferably extends both above and below the top of the tower, as shown. In the example illustrated in the drawings, this wheel comprises spaced upper and lower rings 22, 23, and a suitable number of arms or open frames 24 extending radially from the shaft 13 and said rings at equidistant points, and each carrying a series of upright blades or vanes 25, four of such arms being shown in the drawings. This wheel is suitably stayed, as shown at 26. The vanes of each arm 24 are arranged side by side and each vane is preferably mounted at its outer vertical edge upon an upright rock shaft 27 journaled at its upper and lower ends in the adjacent top and bottom bars of the arm 24, so that the vane may swing into a position radially of the wheel, or at an angle to that position, to present either its edge to the wind or its side at a greater or less angle, in order to utilize the maximum power of the wind or less of it, as desired. The rock shaft of each vane is provided at its lower end with a crank 28, and the cranks of the several vanes of a group are connected by a universal rod or link 29, so that by moving said link endwise in one or the other direction, all the vanes of that group are simultaneously adjusted. The swinging movement of the vanes is preferably confined to a quarter turn or quadrant extending from the radial or broadside position shown by full lines in Fig. 4, to the edge-position shown by dotted lines in the same figure. The preferred stop device for limiting their movement in the last-named direction consists of a flexible connection, such as a chain or cord 30 fastened at one end to the wheel-frame and at its other end to a stop arm 31 fixed to the rock shaft 27 of the innermost vane of the corresponding group. Movement of each group in the opposite direction is limited by a similar flexible connection 32 which connects the corresponding universal rod 29 with a horizontally-swinging lever 33 pivoted to the lower member of the wheel frame, there being such a lever for each group of vanes. Each of these levers bears against the inclined face of a regulator or adjusting device preferably consisting of a weighted vertically-sliding wedge 34 moving in an upright guide 35 at the inner end of the adjacent arm 24. These parts are so arranged and proportioned that when the upwardly-tapering wedges or regulators are fully lowered, as shown in the drawings, the levers 33 through the connections 32 prevent the vanes from swinging forwardly beyond their radial position under the pressure of the wind against their sides, but permit the vanes to freely swing rearwardly at right angles to that position under the resistance of the air when they pass around the rear or return side of the wheel, thus presenting their edges to the air and offering the minimum resistance to its rotation.

Means are provided for simultaneously shifting the wedges 34 vertically, to adjust the various vanes at a greater or less angle to the radius of the wheel and consequently to the direction of the wind, and thereby diminish or increase the speed of the wheel. It is apparent that by raising the wedges the levers 33 are positively swung farther inward and caused to swing the vanes out of their broadside position, while by allowing the wedges to descend by gravity, the levers and the vanes are permitted to swing in the opposite direction under the wind pressure against the vanes. In the embodiment herein illustrated, the several wedges are actuated in unison by a vertically-movable weight or controller 36 surrounding the upright shaft 13 and sliding independently thereof on upright guides 37 carried by the tower 12. Moving vertically in the hollow shaft 13 is a head 38 which is connected with the controller 36 by a cable 39. The several wedges are connected with this head by separate cables 40 running over guide pulleys 41 and 42 mounted on the wheel-frame and the upright shaft 13 above the wedges.

To effect the raising of the controller 36, it is provided with suitable counterweights 43 suspended from cables 44 passing over pulleys 45 and fastened at their upper ends to the controller. These pulleys are carried by the tower 12.

The wheel is readily stopped by turning its vanes edgewise to the wind. This is done by lowering the controller 36, so as to raise the wedges 34 and actuate the universal links 29, as above described. The preferred means for pulling down the controller 36 for this purpose comprise a grooved drum 46 mounted on a horizontal shaft 47 supported in a standard 48 and having a hand lever 49 for turning it. Upon this drum is wound a cable 50 which is secured at its upper end to the controller 36. Upon swinging the lever 49 forwardly, the cable 50 is wound upon the drum 46, pulling down the controller against the resistance of its counterweights 43, raising the regulators 34 and stopping the mill by causing the vanes to stand edgewise to the wind. This lever may be locked in position by a catch $49^a$ engaging a notched segment $49^b$, or by any other suitable means.

The connections between the wedges 34 and the controller 36 preferably pass down through the hollow shaft or column 13, and to permit the latter to rotate and the controller to reciprocate freely, the cable 39 is attached at its lower end to a vertically-movable head or block 51 arranged within the column and having oppositely-extending arms 52 passing through vertical slots 53 in the column. These arms terminate in anti-friction rollers $52^a$ which run in an annular raceway $52^b$ in the bore of the controller 36, as shown in Figs. 5 and 6.

In addition to the above-described hand-controlled means for adjusting the vanes and starting and stopping the mill, the latter is preferably provided with automatic governing mechanism for maintaining a regular speed thereof, irrespective of variations in the velocity of the wind. This mechanism is constructed as follows:

54 indicates a centrifugal ball governor driven from the shaft 19 by a belt 55 and pulleys 56 and 57. The customary bell crank lever 58 under the control of the centrifugal governor, is connected by a link 59 with a shifting lever 60 fulcrumed at 61. This shifting lever is pivoted at 62 to a laterally-sliding friction drum 63 having a pair of opposing beveled friction flanges 64, 65, adapted to engage opposite sides of a friction pinion 66. This pinion is secured to a transverse shaft 67 driven from the shaft 19 by gears 68, 69. The friction drum 63 is splined upon a controlling shaft 70 arranged counter to the shaft 19, and the drum is driven in one or the other direction by the engagement of one or the other of its flanges with the pinion 66 which is constantly driven in the same direction by the shaft 19. Connecting the upper and lower sides of the controller 36 with the controlling shaft 70 are a pair of cables 71, 72 which are wound upon the shaft 70, so that when this shaft is turned more or less in one or the other direction by the friction drum 63 under control of the speed governor 54, the controller 36 is raised or lowered accordingly, thereby actuating the regulating wedges 34, as hereinbefore described, automatically adjusting the vanes and keeping the speed of the mill practically constant. The two branches of each of these cables pass around guide pulleys 73, 74 and 75 mounted on the tower above and below the controller 36.

It will now be understood that when it is desired to start the wind mill, the controlling hand lever 49 is swung backward to allow the controller 36 to be raised by the weights 43 and the weighted wedges 34, thereby lowering the latter and allowing the vanes to swing into a radial position under the pressure of the wind as shown by full lines in connection with the right hand group of vanes in Fig. 3. To effect this result, the combined weight of said counterweights and the weighted wedges must obviously preponderate over the weight of the controller 36. When the vanes reach the rear or return side of the wheel they are free to swing rearwardly with their hinged edges facing the direction of rotation of the wheel, as shown in Fig. 3. In this position the vanes offer the least resistance to the rotation of the wheel. When the vanes again reach the front, right hand arc of the circle, the wind returns them to their radial position in which they present their maximum area to its force. Assuming the wheel to be placed under the control of the speed governor, and the wheel to be running at diminished speed, the right-hand flange 65 of the friction drum will mesh with the pinion 66 and drive the shaft 70 in the proper direction to raise the controller and lower the wedges, allowing the vanes to swing farther toward their radial position and more squarely receive the force of the wind. The speed of the wheel is thus increased, but the moment it exceeds the normal, the weights of the centrifugal governor are thrown out farther, and the friction drum is shifted in the opposite direction, causing its left-hand flange 64 to engage the pinion 66 and driving the shaft 70 in the opposite direction. The controller 36 is thereby depressed, the wedges 34 are raised and the vanes are turned at a greater or less angle to their carrying arms 24, thereby correspondingly reducing the effective vane-area presented to the wind and driving the mill at diminished speed. In this manner, the position of the vanes is constantly regulated by the automatic action of the speed governor to compensate for variations in the wind and thus maintain a substantially uniform velocity of the mill.

During such automatic control of the motor the hand lever 49 is wholly disengaged from the segment $49^b$ to allow the controller to rise and fall without restraint except by the centrifugal governor.

It will be observed that each arm or radial wing of the wheel carries a group or series of upright vanes which, when turned in line with one another or all standing radially of the wheel, collectively form a nearly continuous blade having the aggregate area of the entire group, thus presenting a considerable broadside to the wind and utilizing the wind-power to the greatest advantage.

In addition to the important advantages of maximum power and minimum resistance afforded by this improved motor, the feathering action of its vanes is practically noiseless.

It is obvious that some of the improvements herein shown and described are applicable to water motors as well as wind mills or motors.

I claim as my invention:

1. A motor of the character described, comprising a horizontal wheel, an upright rock shaft journaled in the wheel and having a crank, an upright vane carried by said shaft, a horizontally-swinging adjusting lever mounted on said wheel and connected with said crank, and means for actuating said lever.

2. A motor of the character described, comprising a horizontal wheel, an upright rock shaft journaled in said wheel and having a crank, an upright vane carried by said shaft, an adjusting lever connected with said crank, a wedge-shaped regulator engaging said lever, and means for shifting said regulator.

3. A motor of the character described, comprising a horizontal wheel, an upright rock shaft journaled in said wheel and having an actuating crank and a stop-arm, a vane carried by said shaft, a flexible stop-member connecting said stop-arm with the wheel-frame, an adjusting lever, and a flexible connection between said adjusting lever and said crank.

4. A motor of the character described, comprising a tower, a horizontal wheel mounted on said tower and having pivoted vanes, adjusting wedges for said vanes mounted on the wheel, a controller guided on said tower, guide pulleys mounted on said wheel, and cables passing around said pulleys and connecting said wedges with said controller.

5. A motor of the character described, comprising a tower, a hollow upright shaft journaled therein, a horizontal wheel mounted on said shaft and having adjustable vanes, a vertically-movable controlling member surrounding said shaft and guided on said tower, a vertically-movable head arranged within said shaft and rotatable therewith independently of said controlling member, means for connecting said head with said controlling member to move vertically therewith, and operating connections extending from said head to said vanes and passing through said shaft.

6. A motor of the character described, comprising a tower, a hollow upright shaft journaled therein and provided with vertical slots, a horizontal wheel mounted on said shaft and having adjustable vanes, a controller surrounding said shaft and having an annular groove in its bore, a head movable vertically within said hollow shaft and having arms extending through the slots thereof and engaging said groove, and operating connections extending from said head to said vanes and passing through said shaft.

7. A motor of the character described, comprising a tower, a hollow upright shaft journaled therein and provided with vertical slots, a horizontal wheel mounted on said shaft and having adjustable vanes, a controller surrounding said shaft and having a race way in its bore, a head movable vertically within said hollow shaft and having arms extending through the slots thereof into said raceway, anti-friction members mounted on said arms and running in said raceway, and operating connections extending from said head to said vanes and passing through said shaft.

8. A motor of the character described, comprising an upright hollow shaft, a horizontal wheel mounted thereon and having adjustable vanes, a common controller for said vanes arranged within said shaft and movable lengthwise thereof, and a centrifugal governor geared to said shaft and controlling said adjusting member.

9. A motor of the character described, comprising an upright shaft, a horizontal wheel mounted thereon and having adjustable vanes, a common controller for said vanes movable lengthwise of said shaft, guide-pulleys arranged above and below said controller, a winding shaft, an actuating cable wound upon the last-named shaft and having branches passing around said pulleys respectively and secured to the upper and lower ends of said controller, a shaft geared to said upright shaft and carrying a pinion, a drum splined on said winding shaft and having opposing flanges arranged to engage said pinion alternately, and a centrifugal governor geared to said upright shaft and controlling the shifting movements of said drum.

RAY MORRIS.